(12) United States Patent
Van Wijk

(10) Patent No.: US 8,712,117 B2
(45) Date of Patent: Apr. 29, 2014

(54) METHODS, SYSTEMS, AND COMPUTER PROGRAM PRODUCT FOR VIRTUALLY MODIFYING SURFACE REGION CURVATURE TO DETECT PROTRUSIONS

(75) Inventor: Cornelis Van Wijk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 951 days.

(21) Appl. No.: 12/442,764

(22) PCT Filed: Sep. 25, 2007

(86) PCT No.: PCT/IB2007/053885
§ 371 (c)(1),
(2), (4) Date: Mar. 25, 2009

(87) PCT Pub. No.: WO2008/038222
PCT Pub. Date: Apr. 3, 2008

(65) Prior Publication Data
US 2011/0235882 A1    Sep. 29, 2011

(30) Foreign Application Priority Data
Sep. 29, 2006 (NL) .................................. 1032602

(51) Int. Cl.
*G06K 9/00* (2006.01)
(52) U.S. Cl.
USPC ............ 382/128; 382/129; 382/130; 382/131
(58) Field of Classification Search
USPC .................................. 382/128–131
See application file for complete search history.

(56) References Cited

U.S. PATENT DOCUMENTS

| | | | | |
|---|---|---|---|---|
| 4,899,731 A * | 2/1990 | Takayama et al. | ............ | 600/145 |
| 7,369,691 B2 | 5/2008 | Kondo et al. | | |
| 7,747,055 B1 * | 6/2010 | Vining et al. | ................. | 382/131 |

(Continued)

FOREIGN PATENT DOCUMENTS

| | | |
|---|---|---|
| DE | 102005048524 A1 | 4/2006 |
| WO | 0032106 A1 | 6/2000 |
| WO | 0178005 A2 | 10/2001 |
| WO | 03034176 A2 | 4/2003 |

OTHER PUBLICATIONS

Haker et al., Non-distorting Flattening for Virtual Colonoscopy, Springer-Verlap Berlin Heidelberg, 2000, pp. 358-366.*

(Continued)

*Primary Examiner* — Jayesh A Patel

(57) ABSTRACT

A protrusion of at least a part of a surface of an internal part of a human or animal body is detected from three dimensional digital data representing the surface or the part. A surface region is detected from the three dimensional digital data. The surface region has at least one point at which a first and second normal curvature intersect that both have an original curvature value that is larger than zero or both have an original curvature value that is smaller than zero. The second normal curvature has a curvature value that is closer to zero than the curvature value of the first normal curvature. The second normal curvature is digitally modified such that it has a modified curvature value that is closer to zero than its original curvature value. The modification the surface region is digitally deformed such that a deformed surface region is formed. The extent of deformation of the deformed surface region is compared to the detected surface region to determine an amount of protrusion.

18 Claims, 3 Drawing Sheets

(56) References Cited

U.S. PATENT DOCUMENTS

| | | | | |
|---|---|---|---|---|
| 8,306,292 | B2* | 11/2012 | Moriya | 382/128 |
| 8,483,803 | B2* | 7/2013 | Partain et al. | 600/427 |
| 8,577,101 | B2* | 11/2013 | Avila | 382/128 |
| 2003/0223627 | A1* | 12/2003 | Yoshida et al. | 382/128 |
| 2004/0064029 | A1 | 4/2004 | Summers et al. | |
| 2004/0097791 | A1* | 5/2004 | Tokuda et al. | 600/173 |
| 2004/0264778 | A1* | 12/2004 | Liang et al. | 382/203 |
| 2005/0111713 | A1* | 5/2005 | Jerebko | 382/128 |
| 2005/0163356 | A1* | 7/2005 | Makram-Ebeid et al. | 382/128 |
| 2005/0245803 | A1* | 11/2005 | Glenn, Jr. et al. | 600/407 |
| 2006/0210122 | A1* | 9/2006 | Cleveland et al. | 382/117 |
| 2008/0039692 | A1* | 2/2008 | Hirakawa | 600/160 |
| 2009/0087047 | A1* | 4/2009 | Moriya | 382/128 |
| 2011/0071404 | A1* | 3/2011 | Schmitt et al. | 600/479 |
| 2011/0211743 | A1* | 9/2011 | Avila et al. | 382/131 |

OTHER PUBLICATIONS

Wijk et al., On Normalized Convolution to Measure Curvature Features for Automatic Polyp Detection, MICCAI 2004, Springer-Verlag Berlin Heidelberg, pp. 200-208.*

Dijkers et al., Segmentation and Size Measurement of Polyps in CT Colonography, MICCAI 2005, Springer-Verlag Berlin Heidelberg, pp. 712-719.*

Wijk et al., Detection of Protrusions in Curved Folded Surfaces Applied to Automated Polyp Detection in CT Colonography, MICCAI 2006, Springer-Verlag Berlin Heidelberg, pp. 471-478.*

Hong et al., Conformal Virtual Colon Flattening, Association for Computing Machinery, Jun. 8, 2006, pp. 85-94.*

Dijkers et al, "Segmentation and Size Measurement of Polyps in CT Colonography", Medical Image Computing and Computer-Assisted Intervention-MICCAI, vol. 2749, Oct. 26, 2005, pp. 712-719.

Van Wijk et al, "On Normalized Convolution to Measure Curvature Features for Automatic Polyp Detection" Lecture Notes in Computer Science, Medical Image Computing and Computer-Assisted Intervention, MICCAI, vol. 3216, No. Part 1, 2004, pp. 200-208.

Desbrun et al, "Implicit Fairing of Irregular Meshes Using Diffusion and Curvature Flow", Computer Graphics Proceedings, Annual Conference Series, Aug. 8, 1999, pp. 317-324.

Nappi et al, "Freature-Guided Analysis for Reduction of False Positives in CAD of Polyps for Computed Tomographic Colonography", Medical Physics, AIP, vol. 30, No. 7, Jul. 2003, pp. 1592-1601.

Van Wijk et al, "Detection of Protrusions in Curved Folded Surfaces Applied to Automated Polyp Detection in CT Colonography", Medical Image Computing and Computer-Assisted Intervention, MICCAI, 2006 Lecture Notes in Computer Science, vol. 491, Sep. 29, 2006, pp. 471-478.

Bitter et al, "Candidate Determination for Computer Aided Detection of Colon Polyps", Physiology Function, and Structure Form Medical Images, vol. 5746, No. 1, Feb. 13, 2005, pp. 804-809.

Yoshida et al, "Three-Dimensional Computer-Aided Diagnosis Sscheme for Detection of Colonic Polyps", IEEE Transactions on Medical Imageing, vol. 20, No. 12, Dec. 2001, pp. 1261-1274.

* cited by examiner

METHODS, SYSTEMS, AND COMPUTER PROGRAM PRODUCT FOR VIRTUALLY MODIFYING SURFACE REGION CURVATURE TO DETECT PROTRUSIONS

The invention relates to a method for detecting a protrusion of at least a part of a surface of an internal part of a human or animal body from three dimensional digital data.

The invention also relates to a method that uses three dimensional digital data of a colon wall on the inside side of a colon.

The invention furthermore relates to a method for detecting a protrusion on the inner surface of a tubular and bended part of a human or animal body.

Detecting of lesions that are shaped as protrusions in human or animal bodies can be important for preventing and/or detecting cancerous deceases such as colon cancer in an early state. Conventionally, lesions are searched for example in two dimensional CT (computerized tomography) or MRI (magnetic resonance imaging) images of the colon of a patient. If a doctor distinguishes a lesion in a CT or MRI scan of the colon wall, he can decide whether or not to perform colonoscopy. This decision may be based on the size of the lesion. If the size is larger than a certain threshold, for example an approximate diameter of 1 cm, action will be undertaken. In principle, a larger lesion means a greater risk of cancer. If small lesions are detected, surgery may not be necessary. Regular check ups can then be performed to see if the lesion has grown.

Before CT or MRI scans are performed the colon of the patient must be cleansed, which is an inconvenient operation for a patient. Therefore, a second scan of the same patient is preferably prevented. Furthermore making and checking CT or MRI scans is a time-consuming operation for the doctor wherein errors may occur. For example, in the scan, lesions are hard to distinguish with the human eye over folds in the colon such that the doctor may falsely detect lesions that are not true lesions and/or some lesion may escape detections because they are not recognized as such. For all of the above and other reasons, it is in the interest of the patient as well as the hospital, insurances, etc. that as few as possible errors occur.

For more accurate detection, three dimensional surface renderings are obtained from CT or MRI scans so that the lesions can be recognized automatically or semi-automatically within a shorter period of time. By the conversion to three dimensional data, lesions can be distinguished with the eye relatively more easily from folds. Also, the computer can mark possible lesions based on three dimensional characteristics of the lesion. The automatic or semi-automatic lesion detection will aid in improving the efficacy of the doctor.

In United States patent application US 2003/0223627 A1, a method for detection of colon lesions in three dimensional digital data is described. This known method comprises deriving a three dimensional digital image of the colon wall from CT data, detecting and grouping suspicious surface regions on the colon wall based on certain parameters such as the SI (shape index).

The main idea of this known method is that lesions are well modeled by hemispherical objects, which have an SI (shape index) of 1. On the other hand, folds have an SI of 0.75. In the known method, surface regions on the colon wall that have an SI that is close to 1 are recognized as suspicious surface regions, basically.

In order to detect most or all lesions, also the ones that don't look like hemispheres, the threshold values must be set very sensitive, i.e. relatively low. Because lesions seldom have a nearly perfect hemispherical shape, a relatively sensitive SI may be set relatively close to 0.75. However, with a sensitive threshold, small bumps on folds in a colon or small changes in the fold width may also be recognized as suspicious regions, such that a sensitive SI threshold setting may lead to too many false detections. On the other hand, with a less sensitive SI threshold, for example an SI closer to 1, some lesions, for examples the ones that are less hemispherically shaped, may escape detection.

To compensate for errors such as undetected lesions or too many false detections, besides the SI, the known method also includes other parameters in the detection process, such as a curvedness and/or gradient value of the CT scan. Furthermore, suspicious surface regions can be further enlarged by hysteresis thresholding, in which case surface regions adjacent to the suspicious region are added if the SI and/or said other parameters of the adjacent region are above a second threshold. Finally, a volume threshold is implemented such that only large enough lesions are detected. For example, a minimum volume of 38 mm$^3$.

In the known method, still too many errors occur. For example, since in many cases lesions are irregular and not symmetric, a hemisphere doesn't qualify a lesion adequately. Also, SI and curvedness thresholds will only select convex parts and not all parts of the protrusion. Because, at first, lesion selection is generally based on shape, errors may occur for small as well as large lesions.

A goal of the invention is to provide a solution that is more effective.

In a first aspect, the invention comprises a method for detecting a protrusion of at least a part of a surface of an internal part of a human or animal body from three dimensional digital data representing said surface or said part thereof, comprising the following steps. A surface region is detected from the three dimensional digital data, which surface region has at least one point at which a first and second normal curvature intersect that both have an original curvature value that is larger than zero or both have an original curvature value that is smaller than zero, wherein the second normal curvature has a curvature value that is closer to zero than the curvature value of the first normal curvature. Next, the second normal curvature is digitally modified such that it has a modified curvature value that is closer to zero than its original curvature value. By this a deformed surface region is formed, wherein the extent of deformation of the deformed surface region as compared to the detected surface region is related to an amount of protrusion.

Surface regions with a point where two normal curvatures intersect that both have curvature values above zero or both below zero are double curved in a normal direction to the surface. These surface regions will be called protrusions and may for example include lesions.

After detection of a protrusion, the visual image of the protrusion can be at least partly removed by decreasing a second curvature that has a curvature value closest to zero of the two curvatures. In this way, the detected surface region is deformed so that an image can be obtained of an amount of protrusion. For example, a bump on a fold can be at least partly brought back so that a global insight can be obtained of what the fold would look like when the bump is at least partly taken away. This insight can serve as an aid in deciding, manually or automatically, if the bump may comprise a lesion. Furthermore a decision whether or not a protrusion is or comprises a lesion or other harmful object can be made on the basis of the extent of deformation, in other words the amount of protrusion, manually or (semi)automatically. Obviously the image that is obtained from the deformed surface region may be a virtual image. It should be understood that all steps of the method according to the invention can be just virtual calculating steps in the computer.

In a method according to the invention, also asymmetric, irregularly shaped lesions and concave parts of a protrusion can be detected. Also, a selection process of candidate lesions can be based on a direct insight in the size of the protrusion such that with an increasing size of a lesion, the chance that it escapes detection diminishes. Thus, a method according to the invention can also be very effective since larger lesions are relatively more harmful and small lesions generally are less urgent. Especially in the range of lesions that would be of interest, namely relatively large lesions, relatively less errors than in known methods will occur. Also, by comparing the deformed surface region with the original surface region, a method according to the invention can be relatively less sensitive to imaging conditions such as for example noise, CT scanner parameters, patient preparation, scales at which any shape index and curvedness are computed.

Due to a first deformation of the detected surface region by modifying the second normal curvature, the point of intersection is moved and both first and second normal curvatures were modified. In an embodiment, after this deformation again a point is searched on the deformed surface region, at which point two modified normal curvatures intersect with modified curvature values above or below zero. The modified curvature value of the modified second normal curvature is again modified to a value closer to zero such that the deformed surface region is again deformed. After each deformation another deformation can be applied until the surface region is deformed up to a sufficient level.

In another embodiment, the step of deformation of the surface region is repeated until the modified curvature value of the second normal curvature is approximately zero. When the curvature value of the second normal curvature is approximately zero, the surface region is smoothened with respect to its surroundings such that an insight can be obtained of what a colon wall would look like without the protrusion, for example. It is also possible to perform enough steps so that an insight can be obtained of the size of the protrusion, so that in specific embodiments, k2 doesn't have to be equal to zero. Also the extent of deformation can be calculated and the total amount of the imaged protrusion can be estimated. Different dimensions of the protrusion, for example the width, length, area, surface area, base length, volume, height, etc. can be assessed or gathered digitally. Furthermore, by deforming the suspicious surface region until the second normal curvature is zero, for example the size of a lesion can be manually estimated from a three dimensional digital image on a display, wherein an image of the colon wall with and without a protrusion can be displayed.

In an embodiment, the extent of deformation is used for comparing with a threshold such that the estimated size of the protrusion determines if a protrusion is selected as a possible lesion. Since size can determine if the protrusion poses a possible health threat this is a direct way of selection. Depending on the threshold, relatively small protrusions, for example comprising small bumps or relatively harmless lesions, may be prevented from selection. Relatively large protrusions, for example comprising relatively large and possible harmful lesions, are selected. By using said threshold, in one step possibly harmful protrusions are separated from harmless protrusions.

In another embodiment, the first and second normal curvatures involve first and second principal curvatures, the values of which are indicated as k1 and k2, respectively. As a definition: k1>k2. A protrusion on a surface can be characterized by having a point where either k1>k2>0 or 0>k1>k2. In the first case, k2 will be changed to a value of approximately zero and in the second case, k1 will be changed to a value of approximately zero. How k1 and k2 are defined may for example depend on the chosen direction of the normal through said point. For example, bumps in a surface can be detected by k1>k2>0, and dents by 0>k1>k2, or depending on the relative location, dents by k1>k2>0 and bumps by 0>k1>k2.

In an embodiment, the deformed surface is obtained by solving the equation $L(\overline{X})=F(\kappa_2)$. It will be understood by those skilled in the art that solving this equation will provide a k2 approximately or equal to zero.

In a different aspect, the invention comprises a method, wherein three dimensional digital data represents a colon wall on the inside side of a colon is digitally deformed at regions that are double curved towards the inside of the colon, which regions represent protrusions in the colon wall, such that three dimensional digital data is obtained of what the colon wall would look like without said protrusions.

In a still further aspect, the invention comprises a method for detecting protrusions on the inner surface of a tubular part of a human or animal body, comprising the steps of scanning the body or parts thereof to obtain three dimensional digital data of at least a part of an internal surface of the tubular part, detecting a surface region from the three dimensional digital data, wherein the surface region has at least one point, at which a first and second normal curvature intersect that both have an original curvature value that is larger than zero, wherein the second normal curvature has a lower curvature value than the first normal curvature, digitally modifying the second normal curvature such that it has a modified curvature value that is lower than its original curvature value, by which modification the surface region is digitally deformed such that a deformed surface region is formed, wherein the extent of deformation of the deformed surface region as compared to the detected surface region is related to an amount of protrusion.

In clarification of the invention, embodiments thereof will be further elucidated with reference to the drawing. In the drawing.

Figure 5:
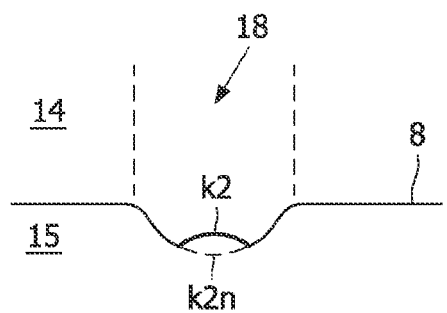

FIG. 5 also illustrates an original surface region and a deformed surface region.

In this description, identical or corresponding parts have identical or corresponding reference numerals. The exemplary embodiments shown serve merely as illustration and should not be construed to be limitative in any way. For example, although particularly colon lesion detection is described, the invention relates to the detection of protrusions in internal parts of the body in general. Also, in the description curvature values k1 and k2 are assumed to be above zero for protrusion detection. However, those skilled in the art will recognize that k1 and k2 may also both be below zero, wherein if necessary several equations may be changed accordingly.

Figure 1:
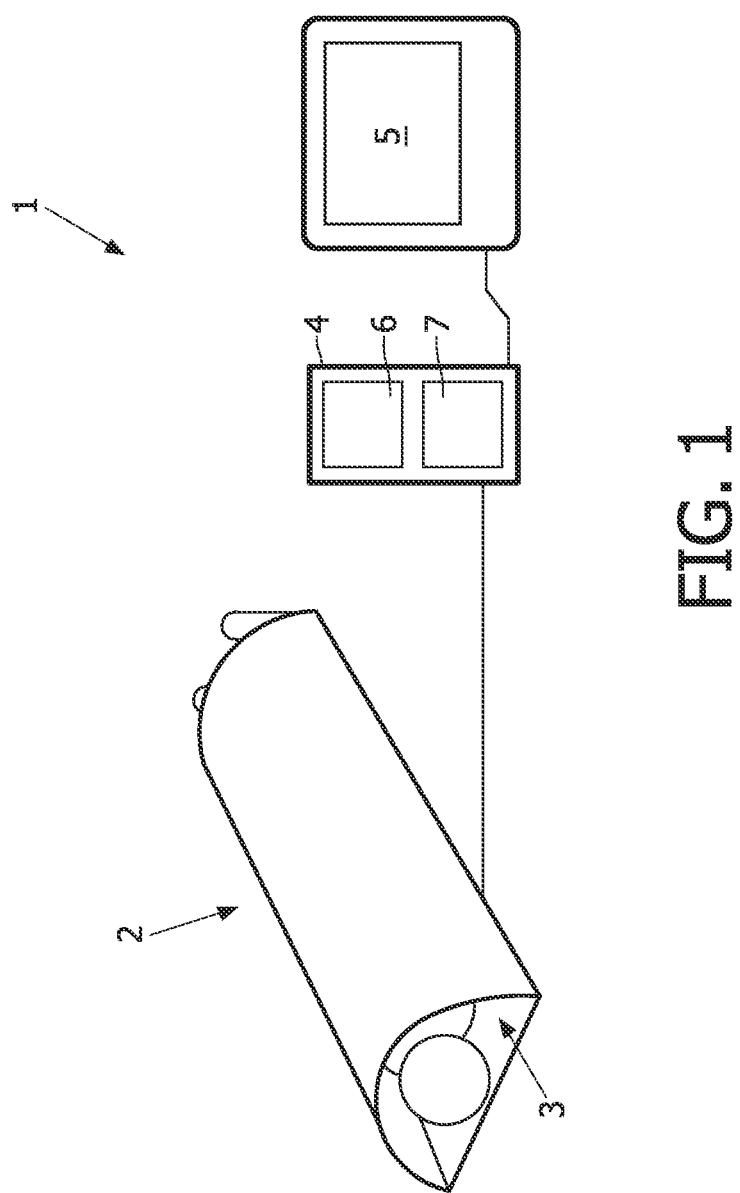
FIG. 1 shows a schematic drawing of an embodiment of a system according to the invention.

FIG. 1 schematically illustrates an embodiment of a system 1 for the detection of protrusions in internal parts of a human or animal body, in vivo or in vitro, i.e. a patient. This system 1 for example comprises a scanning device 2, for scanning internal parts of a body 3 of a patient, a computer 4 and a display 5. In the figure the computer 4 comprises a processing circuit 6 and a storage arrangement 7. In use, the storage arrangement 7 is loaded with a computer program product. The display 5 is configured to display medical data, in particular three dimensional digital data. The scanning device 2 sends two and/or three dimensional data to the computer 4. The computer 4, in particular the processing circuit 6, further processes the received data such that it is converted into said three dimensional medical data to be displayed on the display 5. Obviously, the computer 4 may receive scanning data via any means, for example via a wired or wireless network, any data carrier such as for example a CD, DVD, hard disk, etc. or via the scanning device 2.

Figure 2C:
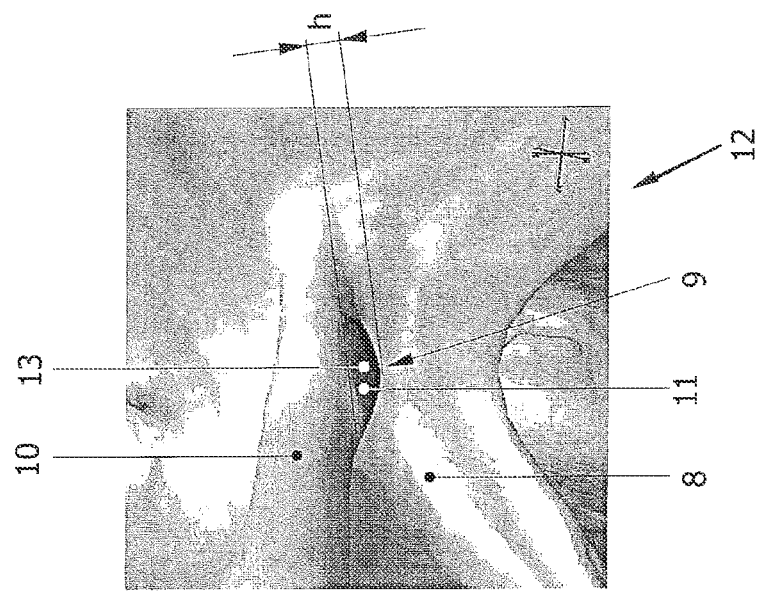
FIGS. 2A, 2B and 2C show three screenshots of a display displaying three dimensional medical images.
Figure 2B:
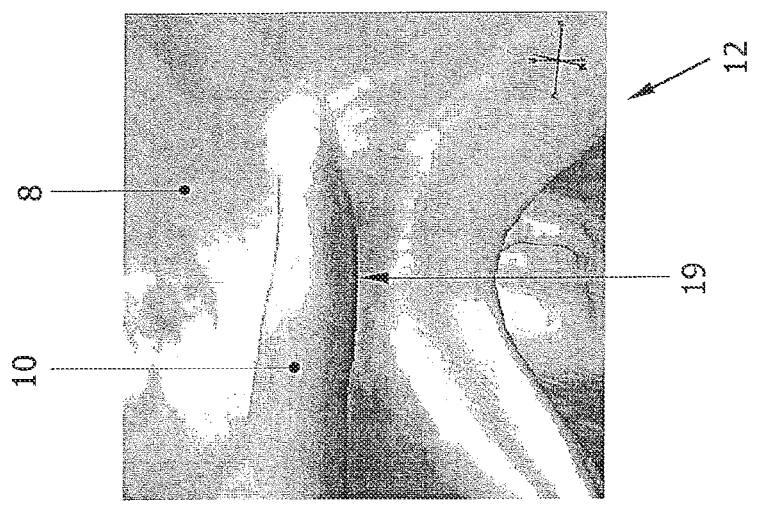
Figure 2A:

Scanning device 2 is configured to obtain data of an internal part of the body 3. In an exemplary embodiment the internal part comprises a colon wall. Three dimensional medical data is obtained from the scanning process, from which a digital image 12 is derived, see for example FIG. 2C. This digital image 12 may for example form a screenshot of a virtual representation of internal parts of the body 3 of the patient, which representation may for example comprise moving images and/or have three dimensional animation-like features. Said digital image 12 can for example be studied by a doctor and a certain area 11 that needs special attention from the doctor can be marked by the computer 4. For example, when a lesion 11 is present in a colon wall, it is detected by the computer 3 from the digital image 12, as can be seen in FIGS. 2A and 2C. To aid in the detection of a lesion 11 by a doctor, the protrusion can be marked, for example with a distinguishable color 13 or a darker or lighter tan, as shown in FIG. 2C. After marking of the protrusion by the computer 4, the doctor may decide directly or in a separate session if medical action should be taken.

In an embodiment, for the detection and classification of lesions a suspicious surface region 9 comprising a lesion is deformed, i.e. flattened or smoothened, preferably gradually. By deforming said suspicious surface region 9 an image 12 can be obtained of what the colon wall would look like without having said lesion. This is illustrated in FIGS. 2A, 2B and 2C. FIG. 2A illustrates a three dimensional digital image 12 of a colon wall 8 with a fold 10. On the fold 10 a suspicious surface region 9 is situated that comprises a lesion 11. The system 1 may consequently detect the lesion 11 by a method that will be described into more detail below.

As can be seen from the example in FIG. 2B, the suspicious surface region 9 is digitally deformed into a deformed surface region 19. In other words, the suspicious surface region 9 comprising the lesion 11 is smoothened as compared to the surrounding colon wall to a deformed surface region 19, which represents the colon wall 8 as if no lesion 11 was there. In this particular example the wall 8 comprises a fold 10 on which fold the lesion 11 is situated. The deformation from an image according to FIG. 2A to one according to FIG. 2B can necessitate a number of steps in between. It can be an iterative process. Consequently, at the site of the fold, the colon wall 8 is smoothened in such a way that the fold 10 looks as if no lesion is present.

After the final step illustrated by FIG. 2B, a calculation can be made of the extent of deformation that the deformed surface region 19 underwent as compared to the original surface region 9. In this embodiment, the extent of deformation corresponds to an estimation of a total amount of protrusion of the lesion 11. The amount of protrusion can for example be represented by any of the dimension parameters volume, length, width, surface area, base area, height h, etc. Any of these parameters can be calculated and/or displayed separately, next to or instead of the digital image 12. If the value of any of these parameters is above a specific threshold, a computer may classify the corresponding protrusion.

In an embodiment, a protrusion is detected by detecting at least one point p on the colon wall surface 8 where the normal curvature values are above zero. To perform a smooth deformation and calculate the dimensions of the deformation, equations are used that apply curvature values k1 and k2 of first and second principle curvatures, respectively, wherein k1 and k2 are above zero. All adjacent points p that have a k1 and k2 above zero form a surface region that is a protrusion. One might argue that such protrusions are numerous and that the method according to the invention will lead to relatively many candidate lesions, since for example small bumps are also detected as protrusions. For example, a protrusion may be almost flat but still have a k1 and k2 above zero. However, the method according to the invention will lead to the possibility of a quantitative assessment of the protrusion and permits intuitive judgment of the candidate protrusions by the specialist, as will follow from the description.

Figure 3:
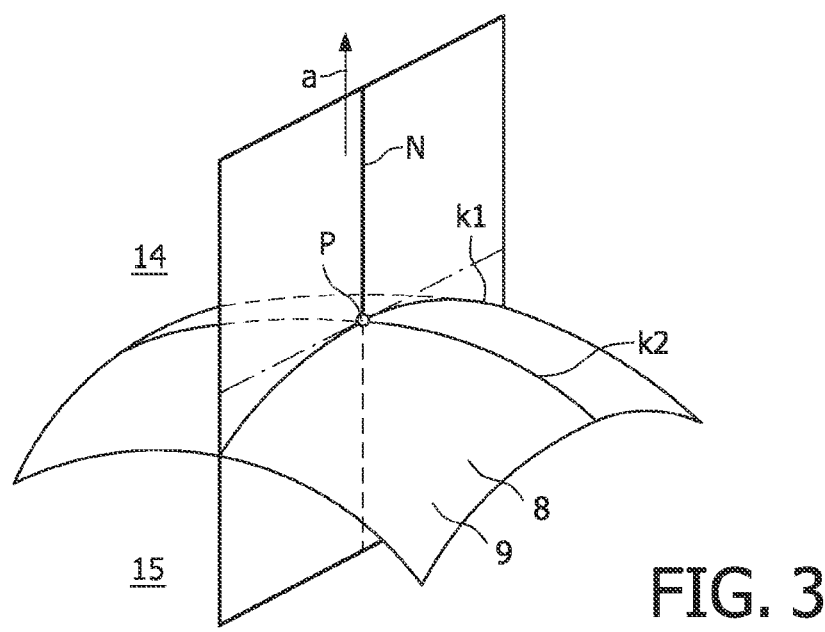
FIG. 3 illustrates a schematic view of principle curvatures on a surface.

In principle, a protrusion is directed towards the inside 14 of a colon and has at least one point p with normal curvature values above zero, see also FIG. 3. A said point p, the normal N has a positive direction towards the inside of the colon 14, in the direction of the arrow a. The outside 15 is the tissue which forms the colon wall 8 and beyond. Dents in a colon wall 8 are directed towards the outside 15 and are assumed to have at least one point with a k1 and k2 below zero. For those skilled in the art it is obvious that in a system 1 according to the invention protrusions may also have a k1 and k2 below zero and dents may have a k1 and k2 above zero. In the case, a normal would be directed in the opposite direction than the normal N that is indicated in FIG. 3. In principle it is a matter of choice to which of the normal directions the normal is directed. In any case, k1 and k2 are defined as the maximum and minimum values, respectively, of the normal curvatures through point p. Normal curvatures and principal curvatures are common knowledge for those skilled in the art. See, for example, M. DoCarmo, "Differential geometry of curves and surfaces", Prentice Hall 1976 [0060].

Figure 4:
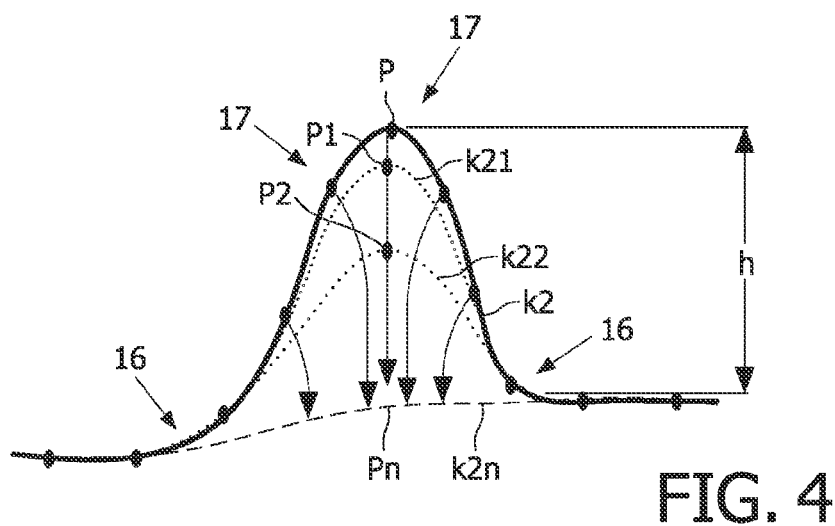
FIG. 4 illustrates a schematic sectional view of an original surface region and a deformed surface region.

Since it is generally accepted that larger protrusions have a higher risk of being harmful than smaller ones, in principle only those protrusions that protrude with a sufficient amount need to be taken into account. In an embodiment, the surface region 9 where k1>k2>0 is deformed such that k2 is deformed to a value closer to zero and p is translated to p1, as can be seen from FIG. 4. Also k1 changes. At p1 a new second principal curve value $k2_1$ is calculated. After deformation of the surface region 9, again points are searched where k1>k2>0, after which the deformed surface region 9 is again deformed and $p_1$ is translated to $p_2$ having a new changed second principal curve $k2_2$. This step can be repeated for example n times until the deformed second principal curvature value $k2n$ is approximately zero for all points $p_n$ on the deformed surface region 19. In this way protrusions, curved in two positive directions, like lesions 11, are deformed such that the colon wall 8 is deformed so that it looks as if no protrusion is there while folds will be unaffected. Also, in this embodiment, the concave regions 16 and the convex regions 17 of the protrusion will be taken into account for the total deformation and calculation of the amount of protrusion.

In particular embodiments the modified second principle curvature $k2_n$ can be brought to a value lower than zero, for example when the protrusion that is to be deformed is located in a concave fold 18 of the colon wall 8. This is illustrated in FIG. 5.

The extent of deformation to arrive at the deformed surface region 19 as compared to the original surface region 9 is a measure of the amount of protrusion. In different embodiments, different parameters may indicate the extent of deformation. In an embodiment, the maximum height of a protrusion can for example be detected by measuring the height h of the largest displacement of a point p to a point $p_n$ on the surface region 9. Since the height h of the protrusion may be an indication of the possible risk that a detected protrusion is a harmful lesion 11, the threshold for selecting a protrusion can be set at a specific height h, for example one, three or five mm's. When the protrusion exceeds this threshold, it is selected to be a conspicuous lesion 11. The height of the threshold can also determine how sensitive the lesion selection process is.

Also second and/or multiple thresholds can be set. For example, hysteresis thresholding can be applied, wherein adjacent regions of a selected surface region are also included in the protrusion. For example, regions that surround a protrusion that exceeds a first threshold are compared with a second threshold that is lower than the first threshold. For example, a protrusion is found wherein the height h of the protrusion exceeds a first threshold of 1, 3 or 5 millimeters. Thereafter, the surrounding regions are compared to a second threshold of 0.5, 1.5 or 2 mm, respectively, for example. Then, the surrounding regions that exceed the second threshold are included in the protrusion and the full protrusion is considered to be the whole region of the surface which exceeds the second threshold and includes an, oftentimes smaller, region that exceeds the first threshold. Multiple surface regions and adjacent regions may be included in the protrusion, for example because they overlap or because they are within a specific distance of the protrusion. Of course this example of hysteresis thresholding serves merely as an illustration and multiple methods of hysteresis thresholding can be applied as known in the art.

In different embodiments other threshold parameters can be applied instead of or in combination with the height h. For example, the volume between the original surface region 9 where k1>k2>0 and the deformed surface region 19 can be a measure of the amount of protrusion so that a threshold may be applied to volume. Other parameters that can be used for a threshold and to measure the protrusion are for example width, length, area, surface area and base length.

In an exemplary embodiment a technique for deforming an original surface region 9 to a deformed surface region 19 may use the following principles.

In an exemplary embodiment a system for protrusion detection employs surface deformation on triangle meshes. A triangle mesh is generated by a marching cubes algorithm applied to three dimensional CT data using a threshold of −750 Hu (Hounsfield units). A typical mesh size comprises around $10^6$ vertices, for example.

In M. Desbrun et al., Implicit fairing of irregular meshes using diffusion and curvature flow. In SIGGRAPH 99, 1999, a method is presented to rapidly remove rough features (noise) from irregularly triangulated data. It was based on the diffusion equation:

$$\frac{\partial X_i}{\partial t} = \lambda L(X_i).$$

$$L(X_i) = \left(\frac{1}{N_1} \sum_{j \in 1ring} X_j\right) - X_i$$

where $L(X_i)$ is a discrete (1-ring) estimate of the Laplacian at vertex i. X are the positions of the mesh points, $N_1$ is the number of vertices in the 1-ring neighborhood of vertex $X_i$ and $\lambda$ is the diffusion coefficient. The solution at time t was found using a backward Euler method which translated the problem into a matrix-vector equation $$(I-\lambda dtL)\overline{X}^{t+1} = \overline{X}^t$$

The matrix $M=I-\lambda dtL$ is sparse and its structure is given by the mesh one-ring relations, $\overline{X}$ is a vector containing all mesh points and I is the identity matrix. This system can be solved efficiently using the bi-conjugate gradient method.

In Desbrun et al., the diffusion was applied to all mesh points. A well-known effect of prolonged diffusion on the complete mesh is global mesh shrinking and in Desbrun et al., solution was proposed by compensating for the reduction of the mesh volume. We, however, apply the diffusion only to a limited number of mesh points, namely the points where k2>0. The majority of points have negative or zero second principal curvature and remain at their original position. They provide the boundary conditions for the other points. Therefore, in contrast to the method suggested in Desbrun et al., global shrinking is not an issue and we can search for the steady state solution of the diffusion equation:

$$\frac{\partial X_i}{\partial t} = L(X_i) = 0.$$

The discrete Laplacian estimates the new position of vertex Xi by a linear combination of its 1-ring neighbors, Xj. Rewriting equation $$L(X_i) = \left(\frac{1}{N} \sum_{j \in 1ring} X_j\right) - X_i$$

then yields a matrix-vector equation:

$$\left(\frac{1}{N_1} \sum_{j \in 1ring} X_j\right) - X_i = M\overline{X} = 0$$

Fortunately, M is sparse and its structure is given by the 1-ring mesh relations. The number of nonzero elements on each row equals the number of 1-ring member vertices. Like the backward Euler formulation this equation can also be solved efficiently using the bi-conjugate gradient method.

It is well known that the solution to the Laplace equation minimizes the membrane energy subject to the imposed boundary conditions. However, our objective is not to minimize the mean curvature, but to minimize the second principal curvature. Therefore, we extend the above equation by introducing a 'force' term. The resulting equation is a Poisson equation:

$$L(\overline{X}) = \overline{F}(\kappa_2)$$

This equation reads as follows: the new positions of the mesh points are found by initially moving each mesh vertex to a position as prescribed by the Laplacian operator. Subsequently, the term on the right hand side 'pushes back' the point such that the resulting second principal curvature is zero. The force term $\overline{F}$ is designed to depend on $\kappa_2$ and is updated after solving equation $L(\overline{X})=\overline{F}(\kappa_2)$. In other words we solve $L(\overline{X}) = \overline{F}(\kappa_2)$ iteratively. The force term is initialized with $L(\overline{X})$ such that we start with:

$$\overline{F}^{t=0} = L(\overline{X})$$

Thus, the 'force field' $\overline{F}$ initially balances the displacement prescribed by the Laplacian and leaves the mesh unaltered. After each iteration $\overline{F}$ is updated with:

$$\overline{F}^{t+1} = \overline{F}^t - \kappa_2 \frac{A_{1ring}}{2\pi} \overline{n}$$

where $A_{1ring}$ is the surface area of the 1-ring neighborhood and $\overline{n}$ is the vertex normal. The last term can be interpreted as a correction term. Note that if $\kappa_2$ is positive $\|\overline{F}\|$ should be relaxed. On the other hand, the magnitude of the reduction term additionally depends on the sampling density of the mesh. If the sampling is dense and $A_{1ring}$ small the magnitude of the correction term should be small. Since $\kappa_2$ equals the reciprocal of the radius of the surface tangent circle $$\left(R = \frac{1}{\kappa_2}\right)$$

in $\kappa_2$-direction, the term $$\frac{2\pi}{\kappa_2^2}$$

is half of the area of the fitting sphere. Therefore, the displacement R needed to remove the curvature in second principal direction is normalized by the ratio of these two areas. The estimated displacement is given by:

$$d_{est} = R \frac{A_{1ring}}{2\pi/\kappa_2^2} = \kappa_2 \frac{A_{1ring}}{2\pi}$$

The resulting displacement of the mesh points yields a deformed mesh which is an estimate of how the colon wall looks like in the absence of protrusions. The amount of displacement of each mesh point (e.g. in millimeters) is an example of a quantitative measure of the amount of protrusion. Candidate objects are generated by applying a threshold on the displacement field.

In different embodiments, multiple types of scanning devices 2 may be suitable to be able to obtain three dimensional digital data of an internal part of the body. In principal, the scanning device 2 may be any device that is able to obtain an image of the internals of the body from the outside or from within. The scanning device 2 may for example comprise a CT scanning device, MRI (magnetic resonance imaging) device, US (ultrasound)/sonar scanning device, intravascular probe or other scanning device 2 to obtain three dimensional digital data of an internal part of the body. Other imaging techniques may for example include X-ray devices, body invasive probes, cameras, such as CCD (charge coupled device) cameras, television techniques, analogue cameras and/or combinations of those or other techniques. From the scanning device 2, data is send to the computer 3. This data may comprise three dimensional digital data of an internal part of the body or may comprise two dimensional images or any data that needs to be processed by a computer 3 for conversion to three dimensional digital data.

Furthermore, although a method, system and computer program product according to the invention are suitable for the possible detection and/or prevention of lesions in colons, other applications are also suitable. Such applications may include any application wherein a protrusion such as a deformation and/or element has to be detected on the surface of an internal part of the body, particularly a tubular and bended part of the inside of the body. Such parts can be colons, airways, arteries or veins, for example. Elements and deformations that may be detected with a method, system and/or computer program according to the invention include, but are not limited to, polyps, nodules, cysts, endobronchial lesions, endovascular lesions, emboli, tumors or other lesions, plaques in arteries or veins, stenosis and other elements and/or deformations that may be present inside a tubular and bended part of the body. The protrusions may for example comprise any element that may cause blocking of the blood flow in an artery or vein.

It shall be obvious that the invention is not limited in any way to the embodiments that are represented in the description and the drawings. Many variations and combinations are possible within the framework of the invention as outlined by the claims. Combinations of one or more aspects of the embodiments or combinations of different embodiments are possible within the framework of the invention. All comparable variations are understood to fall within the framework of the invention as outlined by the claims.

The invention claimed is:

1. A method for detecting a protrusion of at least a part of a surface of an internal part of a human body from three dimensional digital data representing said surface or said internal part thereof, comprising the steps of:
   detecting a point on a surface of the internal part at which a pair of normal curvatures intersect, the pair of normal curvatures including a first principle curvature with a maximum curvature value and a second principle curvature with a minimum curvature, both having curvatures values that are one of (1) both above zero or (2) both below zero, wherein the second principle curvature is normal to the first principle curvature;
   digitally modifying the second principle curvature such that it has a modified curvature value that is closer to zero than its original curvature value, by which modification the surface region is digitally deformed by an extent such that a deformed surface region is formed, wherein the extent of deformation of the deformed surface region as compared to the detected surface region is related to an amount of protrusion; and
   determining the amount of the protrusion based on the comparing of the detected and deformed surface region.

2. A method for detecting and determining a size characteristic of a protrusion of at least a part of a surface of an internal part of a human body from three dimensional digital data representing said surface or said part thereof, comprising the steps of:
   detecting at least one point on the surface at which a first principle curvature having a maximum curvature value and a second principle curvature having a minimum value intersect, both the first and second principle curvatures having one of (1) an original curvature value that is larger than zero or (2) an original curvature value that is smaller than zero, and the second principle curvature having a curvature value that is closer to zero than a curvature value of the first principle curvature, wherein the second principle curvature is normal to the first principle curvature;

digitally modifying the surface until a curvature value of the second principle curvature is approximately zero;

comparing the detected surface region with the modified surface region to determine the size characteristic of the protrusion.

3. The method according to claim 2, wherein the size characteristic includes a height of the protrusion.

4. The method according to claim 1, further including:

displaying the surface region on a display device with a difference between the surface and the deformed surface marked.

5. The method according to claim 2, further including:

comparing an extent of the modification of the surface to a threshold; and when the extent of deformation exceeds the threshold, displaying the modified surface.

6. The method according to claim 5, further including:

marking of the modified surface with a color.

7. The method according to claim 1, wherein said internal part has at least one of tubular and bent shape.

8. The method according to claim 2, wherein said internal part includes a colon, airway, artery or vein, and said surface comprises a wall of a colon, airway, aorta, artery or vein.

9. The method according to claim 1, wherein the protrusion is a lesion.

10. The method according to claim 5, wherein the displayed protrusion is indicative of colon cancer, endobronchial lesions, endovascular lesions, plaques in an artery or vein, stenosis or other mechanisms that cause blocking of the blood flow in an artery or vein.

11. The method according to claim 1, wherein the three dimensional digital data is obtained from a computed tomograph (CT) or magnetic resonance (MR) scan.

12. A method comprising:

digitally deforming three dimensional digital data representing a colon wall on the inside side of a colon at regions that are double curved towards the inside of the colon, which regions represent protrusions in the colon wall until a principle curvature of minimum curvature through a point on the protrusion has a curvature value of zero;

Converting the deformed three dimensional digital data into a display showing what the regions of the colon wall that are double curved towards the inside of the colon wall would look like without said protrusions in the colon wall; and displaying the deformed regions with the same regions of the colon wall before and after the digital deforming; the method further including comparing an extent of deformation of the deformed surface region after digital deforming to the deformed surface region before digital deforming to determine an amount of protrusion; and displaying an indication of the amount or protrusion.

13. A protrusion detection system, comprising:
a display device; and
a processor programmed to perform the method according to claim 1; and
wherein the display device is arranged to display said surface regions.

14. The protrusion detection system according to claim 13, wherein the processor is arranged to receive data from a computed tomography, magnetic resonance imaging or ultrasound scanning device.

15. A non-transitory computer-readable medium carrying software which, when loaded into a computer and actuated, is configured to cause the computer to perform the method according to claim 1.

16. A method for detecting protrusions on the inner surface of a tubular part of a human body, comprising the steps of:

scanning the body or parts thereof to obtain three dimensional digital data of at least a part of an internal surface of the tubular part;

detecting a surface region from the three dimensional digital data, which surface region has at least one point, at which first and second principle curvatures intersect and are normal to each other, the first principle curvature having a maximum curvature value of curvatures through the point and the second principle curvature having a minimum curvature value of curvatures intersecting at the point, the first and second principle curvatures both having an original curvature value that is large than zero, the second curvature having a lower curvature value than the first, the surface being deformed until the second principle curvature has a curvature value of zero such that the deformed surface region depicts the detected surface region without the protrusion;

digitally modifying the second principle curvature such that it has a modified curvature value that is lower than its original curvature value, by which modification the surface region is digitally deformed to form a deformed surface region;

comparing an extent of deformation of the deformed surface region as compared to the detected surface region to determine an amount of protrusion;

comparing the determined amount of protrusion with a threshold;

in response to the determined amount of protrusion exceeding the threshold, displaying the detected surface region with the protrusion marked; and displaying the detected surface without the protrusion; and displaying an indication of the determined amount of protrusion.

17. The method according to claim 1, further including:
comparing the amount of protrusion with a threshold;
in response to the amount of protrusion exceeding the threshold, displaying the deformed surface region and an indication of the amount of protrusion.

18. The method according to claim 2, further including:
displaying the modified surface region and an indication of the size characteristic of the protrusion.

* * * * *